UNITED STATES PATENT OFFICE.

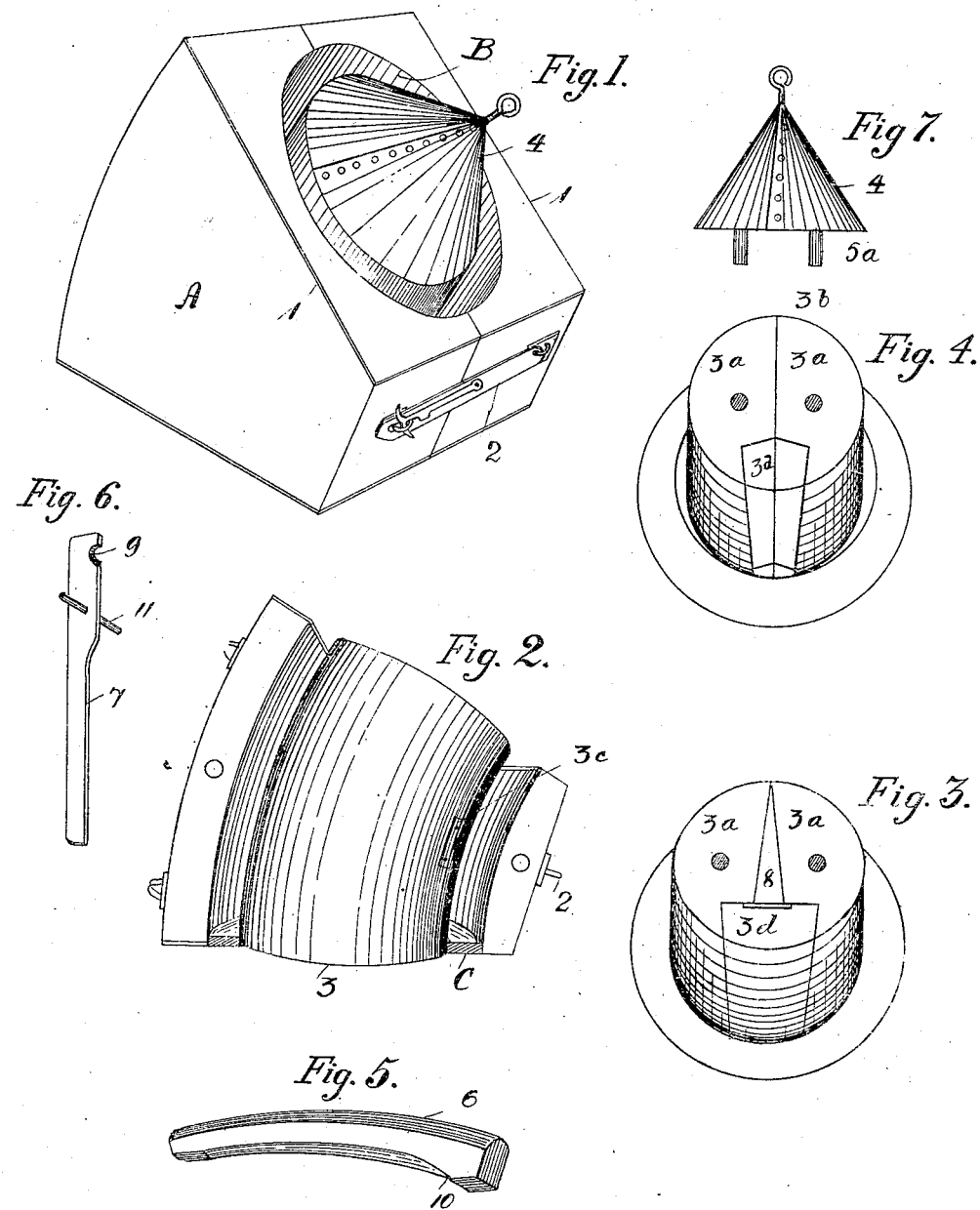

WINFIELD STEINER SIGLER, OF MEXICO, MEXICO.

MOLD FOR CURVED PIPE-SECTIONS.

938,024.  Specification of Letters Patent.  Patented Oct. 26, 1909.

Application filed November 2, 1908. Serial No. 460,770.

*To all whom it may concern:*

Be it known that I, WINFIELD STEINER SIGLER, citizen of the United States of America, residing at Avenida 15, San Pedro, Mexico D. F., Mexico, have invented certain new and useful Improvements in Molds for Curved Pipe-Sections, of which the following is a specification.

My invention relates to molds for forming curved sections of pipes made of concrete, cement, clay, asphaltum or bitumen or any material which will become plastic under conditions of mixture with water or of being heated and become solid under normal conditions of temperature and moisture.

The purpose is to provide a mold having a corepiece readily collapsible from its normal active periphery for insertion into and extraction from the mold, with means to expand it to its proper shape and periphery.

Whereas a mold and core similar to those here described with suitable modifications as to curvature are advantageously applicable to forming straight pipe-sections this invention is of especial value in forming curved sections as the withdrawal of the core in such cases presents especial difficulties.

These objects I attain by the constructions illustrated in the accompanying drawing, in which.—

Figure 1., is a perspective view of my mold box ready for receiving material for making the requisite section; Fig., 2. a view of one half of the mold showing the core in position, Fig., 3. a perspective view of the core expanded to its normal diameter; Fig., 4. a perspective view of the core in a collapsed or closed position; Fig., 5. a perspective view of the wedge used to expand the core; Fig., 6. a perspective view of the tool for extracting the wedge from the expanded core; and Fig., 7. is an elevation of the conical cap over the core.

In all the views identical reference symbols denote identical parts.

The mold box A, preferably made of wood is made up of the two half sections 1—1 each containing a recess B, axially curved to correspond to the curve of the desired pipe section and having a semicircular section at any point when cut by a plane normal to the longitudinal curvature at that point.

The bottom of the mold is closed by the annular shelf C, projecting inwardly and horizontally, and tightly inclosing the bottom of the core 3. The two halves are locked together by hinged hasps and staples 2, or by any other suitable means forming a curved cylindrical hollow of the diameter of the outside of the pipe. The core 3 preferably made of wood may be described as an axially curved cylinder, said axial curvature corresponding to the curvature of the pipe and of a diameter equal to the internal diameter of said pipe. This core is cut into two equal halves 3ª, 3ª, along the diameter 3ᵇ, Fig. 4, which parts are joined at one side of the core by the hinge 3ᶜ. On the side diametrically opposite to said hinge there is cut out from the face of the cylindrical sectioned core as originally made a wedge 3ᵈ, extending the length of the core conforming to its curvature and having a rectangular section with exception of the curved outer side and tapering in circumferential width as it approaches the bottom of the core, and there is also cut enough from each inner face of said core halves to leave the hollow space 8, extending throughout the length of the core of ungular cross section. When the space 3ᵈ, is filled by the wedge 6, the core is expanded to its normal diameter as in Fig. 3, but when the wedge is withdrawn the two halves collapse to form a core piece no longer of circular section and of reduced cross section as in Fig. 4, which enables it to be readily entered into and withdrawn from the moldbox A.

In molding, the box A, is closed and locked, the core 3, expanded to its full diameter by insertion of the wedge 6, is inserted in place so that its sides are at all points at an equal distance from the inner sides of the mold, the top of the core and the upper entrance to the ungular space 8, are covered by the conical cap 4, the sloping sides of which guide any stray material into the mold groove to be filled; concrete, cement or whatever the pipe material may be is poured into the mold completely filling the same. The cap 4, has a flat bottom from which project two pins 5ª, engaging in corresponding holes in the top of the core, whereby its two halves are held together. After the material has become sufficiently hard the mold is readily withdrawn by unlocking the hasps 2, and taking away the mold section. The conical cap 4, is taken off the core and the wedge 6, extracted therefrom by inserting the hook 9, at the end of lever 7, under the shoulder 10 of said wedge, operating through the ungular space 8 on each side of which rests the fulcrum piece 11 and by bearing down on said lever. The wedge extracted, the core at once collapses and can readily be withdrawn from the now completed pipe.

I recognize that many different devices based on the above specified features of construction can be used to facilitate the molding of concrete pipes, but I have here indicated only the device which to me seems most adequate for the purpose without prejudicing my claim to any modification coming within the scope of the herein expressed inventive idea.

I claim:

A mold for pipes having a female portion consisting of two halves with means for locking them together, containing a cylindrical hollow space of a diameter and curvature corresponding to the desired curvature of the pipe and closed at the bottom by an annular shelf and a core of said curvature and normally of the diameter of the inside of said pipe, being made in two originally semi-cylindrical halves, hinged together at one side, each having its inner face cut away in the completed core at a taper increasing from said hinged side along the diameter of section and terminating at the opposite side in a downwardly tapering recess of rectangular section excepting as to its peripheral side, a wedge driven into said recess having a peripheral side exactly piecing out the peripheral sides of said halves, the surface of said core being of a diameter equal to the inner diameter of said pipe, the inner faces of said halves forming with the back of said wedge an opening of ungular section extending from the top to the bottom of said core and covered on top when the material is put into the mold by a conical cover having a flat bottom with means for securing it to the top face of said core for holding its said two halves together.

In testimony whereof I affix my signature in presence of two witnesses.

WINFIELD STEINER SIGLER.

Witnesses:
J. GRANDJEAN,
JOSÉ MATA.